(12) United States Patent
Bakhsh et al.

(10) Patent No.: US 6,428,037 B1
(45) Date of Patent: Aug. 6, 2002

(54) INFLATABLE CURTAIN

(75) Inventors: Ali Emam Bakhsh, Rochester Hills; Russell E. Stein, Leonard; Ayad G. Nayef, Sterling Heights, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/839,912

(22) Filed: Apr. 20, 2001

(51) Int. Cl.$^7$ .................. B60R 21/22; B60R 21/24
(52) U.S. Cl. .................. 280/729; 280/730.2; 280/743.2
(58) Field of Search .................. 280/730.2, 729, 280/749, 730.1, 743.1, 743.2

(56) References Cited

U.S. PATENT DOCUMENTS

| | | | |
|---|---|---|---|
| 5,865,462 A | 2/1999 | Robins et al. | |
| 5,884,937 A | 3/1999 | Yamada | |
| 6,010,149 A | * 1/2000 | Riedel et al. | 280/730.2 |
| 6,073,961 A | 6/2000 | Bailey et al. | |
| 6,099,029 A | 8/2000 | Haland et al. | |
| 6,176,515 B1 | * 1/2001 | Wallner et al. | 280/730.2 |
| 6,237,938 B1 | * 5/2001 | Boxey | 280/730.2 |
| 6,237,939 B1 | * 5/2001 | Resh | 280/730.2 |
| 6,237,943 B1 | * 5/2001 | Brown et al. | 280/730.2 |
| 6,332,628 B1 | * 12/2001 | Tschaeschke | 280/730.2 |

* cited by examiner

Primary Examiner—Peter C. English
(74) Attorney, Agent, or Firm—Tarolli, Sundheim, Covell, Tummino & Szabo L.L.P.

(57) ABSTRACT

Apparatus (10) includes an inflatable protection device (14) that inflates away from a vehicle roof (18) into a position between the side structure (16) of the vehicle (12) and a vehicle occupant. The protection device (14) comprises inflatable front and rear portions (64 and 66) partially separated by a slit (80). An inflation fluid source (24) provides inflation fluid for inflating the protection device (14). A slider assembly (90) is connected to the side structure (16). A flexible elongated member (100) has a first end (102) connected to the front portion (64) at a first location (104) and an opposite second end (106) connected to the slider assembly (90). The slit (80) is positioned between the first location (104) and the slider assembly (90) when the protection device (14) is inflated. The flexible elongated member (100) extends across the slit (80) when the protection device (14) is inflated.

28 Claims, 5 Drawing Sheets

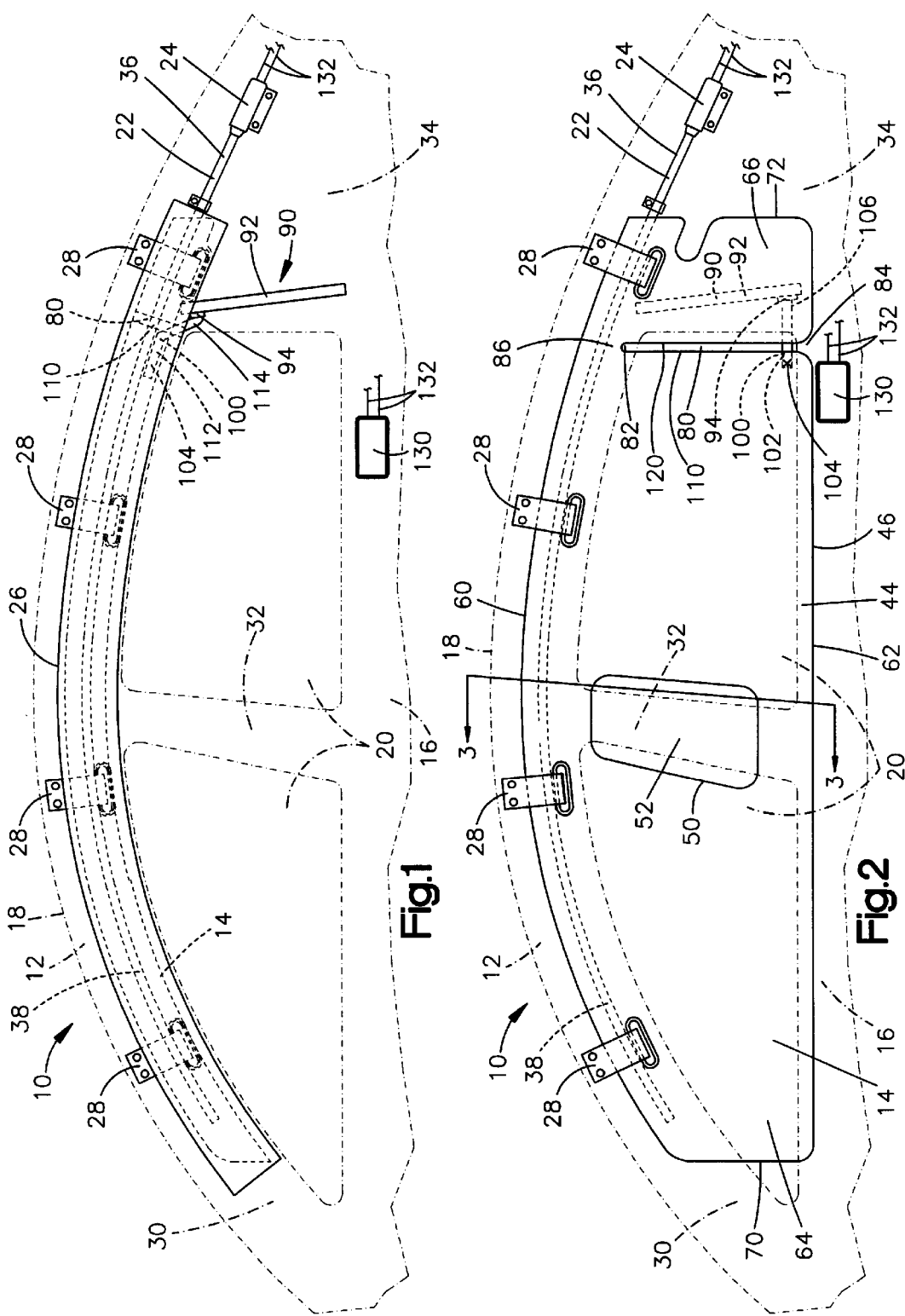

INFLATABLE CURTAIN

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a position between the side structure of the vehicle and a vehicle occupant. The inflatable vehicle occupant protection device comprises an inflatable front portion and an inflatable rear portion. The front and rear portions are partially separated by a slit that extends through the inflatable vehicle occupant protection device.

The apparatus also comprises an inflation fluid source and a slider assembly. The inflation fluid source provides inflation fluid for inflating the inflatable vehicle occupant protection device. The slider assembly is connected to the vehicle side structure. A flexible elongated member has a first end connected to the front portion, at a first location on the front portion, and an opposite second end connected to the slider assembly.

The slit is positioned between the first location and the slider assembly when the inflatable vehicle occupant protection device is inflated. The flexible elongated member extends across the slit when the inflatable vehicle occupant protection device is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant, illustrating the apparatus in a deflated condition, according to a first embodiment of the present invention;

FIG. 2 is a schematic view of the apparatus of FIG. 1 in an inflated condition;

DESCRIPTION OF PREFERRED EMBODIMENTS

Figure 3:
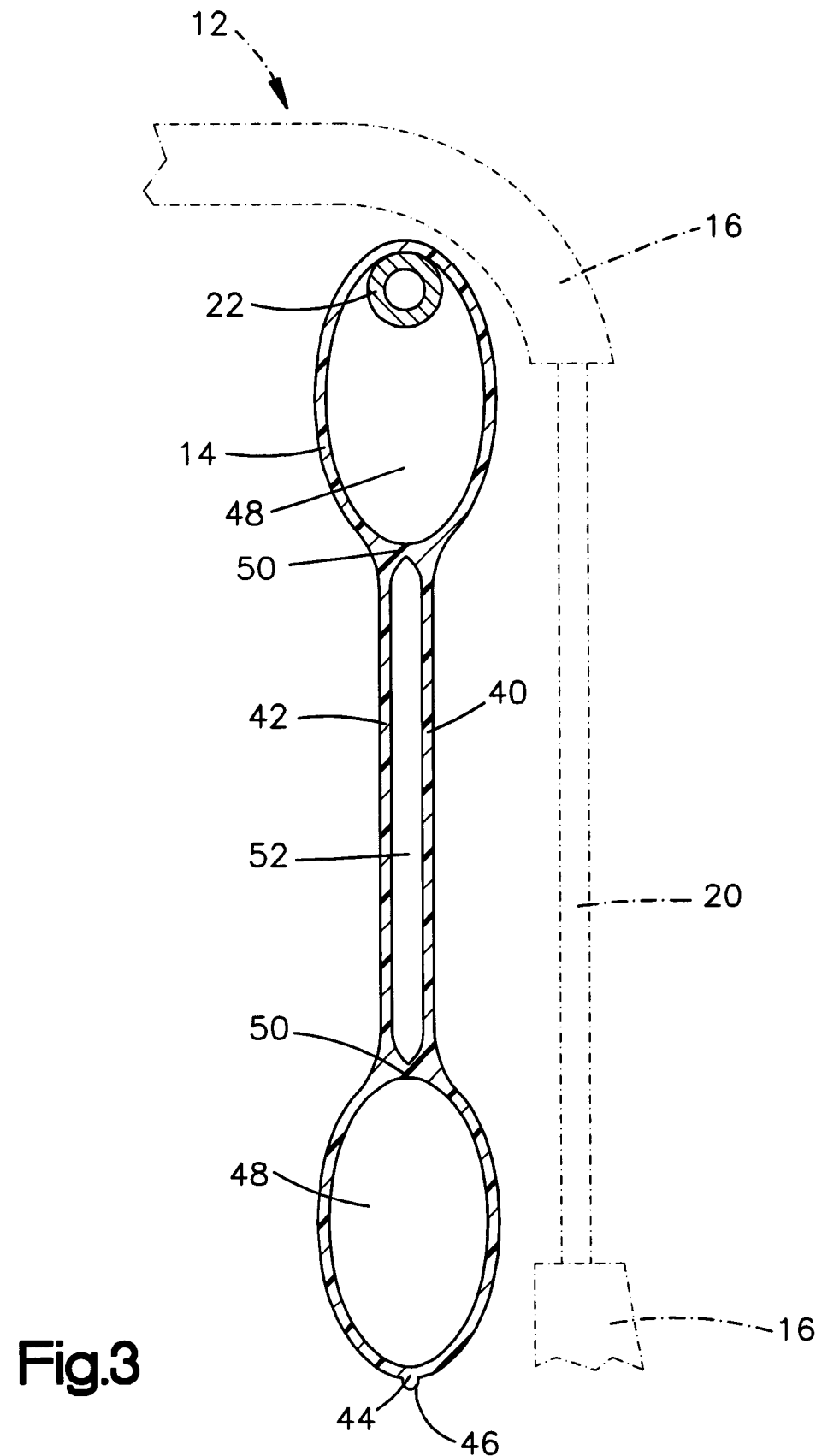
FIG. 3 is a sectional view of the apparatus taken generally along line 3—3 in FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20, an A pillar 30, a B pillar 32, and a C pillar 34. An inflator 24 is connected in fluid communication with the inflatable curtain 14 through a fill tube 22. The fill tube 22 may be constructed of any suitable material, such as metal, plastic, or fabric. Also, those skilled in the art will recognize that the fill tube 22 may be omitted, in which case the inflator 24 may be connected directly to the inflatable curtain 14.

The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by known means 28, such as brackets.

As best illustrated in FIG. 3, the inflatable curtain 14 comprises first and second panels 40 and 42 that are arranged in an overlying manner. Overlapping portions of the first and second panels 40 and 42 are secured together along a perimeter connection 44 (FIGS. 2 and 3) that extends along at least a portion of a perimeter 46 of the inflatable curtain 14. The overlying first and second panels 40 and 42 and the perimeter connection 44 help define an inflatable volume 48 of the inflatable curtain 14 between the panels.

Preferably, the inflatable curtain 14 is constructed as a single piece of woven material. It will be recognized by those skilled in the art, however, that the inflatable curtain 14 could have alternative constructions. For example, the inflatable curtain 14 could be formed from a sheet of material that is folded over to form the overlying first and second panels 40 and 42. Also, the first and second panels 40 and 42 could be formed from separate sheets of material arranged in an overlying manner. The panels 40 and 42 could then be secured together by stitching, ultrasonic bonding, heat welding, or adhesive bonding.

Overlying parts of the first and second panels 40 and 42 may also be interconnected at desired locations within the perimeter connection 44 to form interior connections 50 of the inflatable curtain 14. Such interior connections 50 may help to define non-inflatable portions 52 of the inflatable curtain 14. In the embodiment illustrated in FIG. 2, the inflatable curtain 14 includes a single interior connection 50 that has a generally rectangular shape. Those skilled in the art, however, will recognize that the inflatable curtain 14 may include interior connections 50 arranged in various configurations. For example, the number of interior connections 50 could be increased or decreased and the shape, size and location of the interior connections could be changed.

Preferably, the first and second panels 40 and 42 are interconnected along the interior connections 50 by weaving the panels together. Alternative means, such as stitching, ultrasonic bonding, heat welding, or adhesive bonding could also be used to interconnect the panels 40 and 42 along the interior connections 50.

The first and second panels 40 and 42 are preferably constructed of a fabric, such as nylon, that may be coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14. The first and second panels 40 and 42 may also be formed of single or multi-layered sheets of material.

The perimeter 46 is defined at least partially by an upper edge 60 (FIG. 2) of the inflatable curtain 14, an opposite lower edge 62 of the curtain, and front and rear edges 70 and 72, respectively, of the curtain. The front and rear edges 70 and 72 are spaced horizontally apart along the upper and lower edges 60 and 62 and extend generally vertically between the upper and lower edges. The front and rear edges 70 and 72, however, could be omitted and the upper and lower edges 60 and 62 could be extended until they intersect, in which case the perimeter 46 would be at least partially defined by the intersecting upper and lower edges. Also, while the front and rear edges 70 and 72 are illustrated as being generally vertical, they could extend at some other angle between the upper and lower edges 60 and 62.

The inflatable curtain 14 includes front and rear portions 64 and 66, respectively, that are partially separated by a slit 80 that extends through the inflatable curtain 14. The front portion 64 is partially defined by the upper edge 60, the lower edge 62, the front edge 70, and an edge 110. The rear portion 66 is partially defined by the upper edge 60, the lower edge 62, the rear edge 72, and an edge 120. The edges 110 and 120 of the front and rear portions 64 and 66, respectively, partially define the slit 80.

The slit 80 extends in a generally vertical direction with respect to the direction of forward travel of the vehicle 12 when the inflatable curtain 14 is in the inflated condition illustrated in FIG. 2. Also, when the inflatable curtain 14 is in the inflated condition, the slit 80 is located adjacent or near the C pillar 34 of the vehicle 12. In the embodiment illustrated in FIG. 2, the slit 80 has a generally uniform narrow width and is positioned adjacent and forward of the C pillar 34. The slit 80 could, however, have other desired shapes and positions, and could extend in other desired directions. For example, the slit 80 could have a non-uniform or curved shape, could extend at an angle, and could be positioned such that a portion of the slit, or the entire slit, overlies the C pillar 34 when the inflatable curtain 14 is inflated.

The slit 80 has a first end 82 spaced from the upper edge 60 of the inflatable curtain 14 and an opposite second end 84. Defined between the first end 82 of the slit 80 and the upper edge 60 is an internal passage 86 that provides fluid communication between the front and rear portions 64 and 66. In the embodiment illustrated in FIG. 2, the second end 84 of the slit 80 extends through the lower edge 62 of the inflatable curtain 14. Thus, the front and rear portions 64 and 66 are not connected to each other adjacent the lower edge 62 of the inflatable curtain 14.

The apparatus 10 also includes a slider assembly 90 connected to the vehicle side structure 16 of the vehicle 12. In the embodiment illustrated in FIG. 2, the slider assembly 90 is connected to the C pillar 34 of the vehicle 12. The slider assembly 90 includes a track 92 connected to the C pillar 34 and an element 94 that is slidable along the track.

The apparatus 10 also includes a flexible elongated member, such as a tether 100, that connects the front portion 64 of the inflatable curtain 14 to the slider assembly 90. The tether 100 has a first end 102 connected to the front portion 64 at a first location 104 on the front portion, and an opposite second end 106 connected to the element 94. The first location 104 is preferably positioned adjacent or near the slit 80 and adjacent or near the lower edge 62 of the inflatable curtain 14. The first location 104 could, however, be spaced from the slit 80 and/or the lower edge 62.

Those skilled in the art will recognize that it may be desirable to reduce the length of the tether 100. Preferably, the length of the tether 100 would be about equal to or slightly greater than the distance between the first location 104 and the element 94 when the inflatable curtain 14 is in the inflated position of FIG. 2. Those skilled in the art, however, will recognize that the length of the tether 100 must also be sufficient to extend from the first location 104 to the element 94 when the inflatable curtain 14 is in the stored position of FIG. 1. The tether must similarly have a sufficient length to extend between the first location 104 and the element 94 during inflation as the inflatable curtain 14 moves from the stored position to the inflated position. Advantageously, the slit 80 in the inflatable curtain 14 facilitates folding, rolling, or otherwise placing the inflatable curtain 14 in the stored condition while helping to reduce the required length of the tether 100.

Figure 4A:
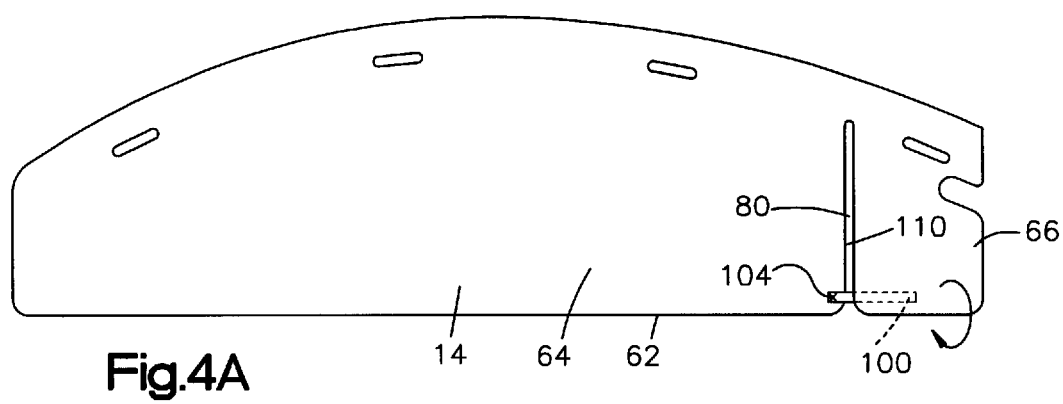
FIGS. 4a–4c are plan views of a portion of the apparatus of FIGS. 1–3 illustrating a manner by which the apparatus may be placed in a stored condition.
Figure 4B:
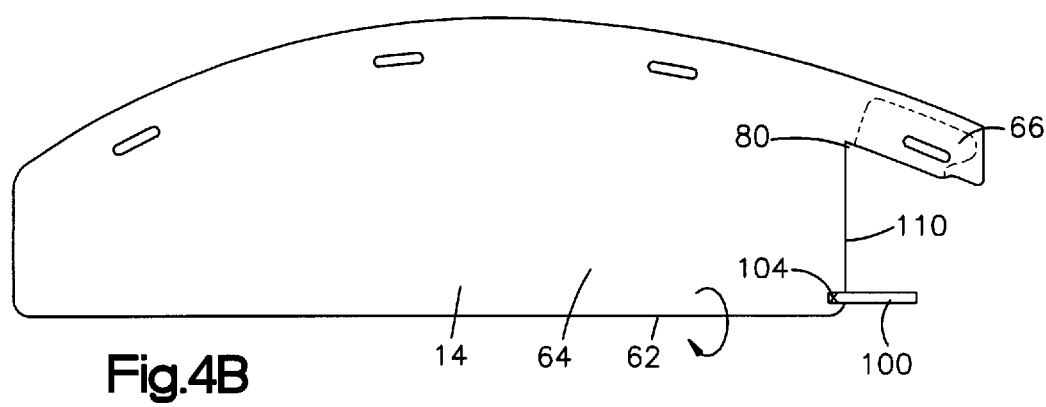
Figure 4C:
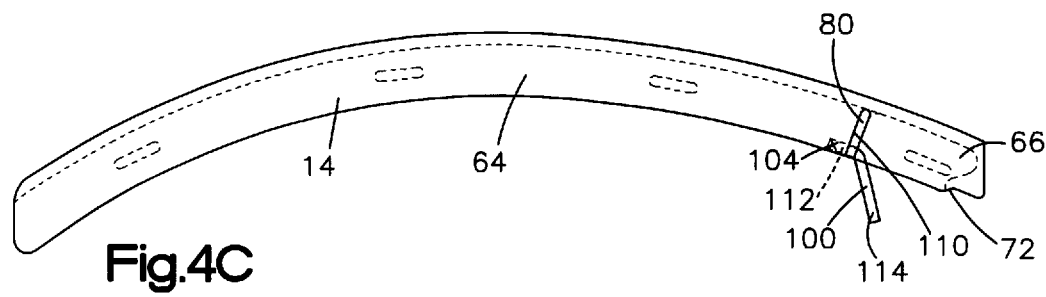

As illustrated in FIGS. 4a–4c, the slit 80 extends through the lower edge 62 of the inflatable curtain 14. Thus, the front and rear portions 64 and 66 of the inflatable curtain 14 can be placed in the stored position independently of each other. The rear portion 66 of the inflatable curtain 14 is rolled, folded, or otherwise placed in the stored position. Preferably, the rear portion 66 is placed in the stored position via an outboard roll, in which the rear portion is rolled up in an outboard direction, towards the vehicle side structure (not shown in FIGS. 4a–4c). The outboard roll of the rear portion 66 is indicated generally by the curved arrow in FIG. 4a. The stored position of the rear portion 66 is illustrated in FIG. 4b.

The front portion 64 of the inflatable curtain 14 is rolled, folded, or otherwise placed in the stored position. Preferably, the front portion 66 is also placed in the stored position via an outboard roll. The outboard roll of the front portion 64 is indicated generally by the curved arrow in FIG. 4b. While the front portion 64 is rolled, the tether 100 extends directly from the first location 104 past the edge 110 of the front portion 64. The stored position of the front portion 64 is illustrated in FIG. 4c.

The rolled up position of the inflatable curtain 14, illustrated in FIG. 4c, is identical to the stored position of FIG. 1. As illustrated in FIGS. 1 and 4c, when the tether 100 is in the stored position, a first segment 112 of the tether extends from the first location 104 to the edge 110 of the rolled up front portion 64. A second segment 114 of the tether extends from the front portion 64 to the element 94 through the slit 80. The first and second segments 112 and 114 of the tether 100 extend along generally straight paths at an acute angle to each other.

The slit 80, being positioned forward of the slider assembly 90, between the slider assembly and the first location 104, helps to reduce the required length of the tether 100. If the slit 80 were omitted, the tether 100 would have to extend from the first location 104, out of the rolled curtain 14 at the rear edge 72 of the curtain, and back to the slider assembly 90.

The vehicle 12 includes a sensor mechanism 130 (shown schematically in FIGS. 1 and 2) for sensing a side impact to the vehicle 12 and/or a rollover of the vehicle 12. The sensor mechanism 130 actuates the inflator 24 in response to the sensing of a side impact or a vehicle rollover. In the event of a rollover of the vehicle or a side impact to the vehicle 12 for which inflation of the curtain 14 is desirable, the sensor mechanism 130 provides an electrical signal over lead wires 132 to the inflator 24. The electrical signal causes the inflator 24 to be actuated in a known manner. The inflator 24 discharges fluid under pressure through the fill tube 22, which directs the fluid into the front and rear portions 64 and 66 of the inflatable curtain 14.

The inflatable curtain 14 inflates under the pressure of the inflation fluid from the inflator 24. The housing 26 opens and the inflatable curtain 14 inflates away from the roof 18 in a downward direction as shown in the drawings and in a downward direction with respect to the direction of forward travel of the vehicle 12 into the position illustrated in FIGS. 2 and 3. During inflation, the front and rear portions 64 and 66 unroll and the inflating inflatable curtain 14 pulls on the tether 100. This causes the element 94 to slide along the track 92 in a direction away from the vehicle roof 18 to the position illustrated in FIG. 2. The slider assembly 90 is configured to block movement of the element 94 along the track 92 in a direction towards the vehicle roof 18.

The inflatable curtain 14, when inflated, extends along the side structure 16 of the vehicle 12 and is positioned between the side structure and any occupant (not shown) of the vehicle. When the inflatable curtain 14 is in the inflated condition, the first panel 40 (FIG. 3) is positioned adjacent the side structure 16 of the vehicle 12. The upper edge 60 (FIG. 2) is positioned adjacent the intersection of the roof 18 and the side structure 16 of the vehicle 12.

When the inflatable curtain 14 is in the inflated condition of FIG. 2, the front portion 64 is positioned adjacent the side structure 16 and overlies at least a portion of the A pillar 30 and B pillar 32 of the vehicle 12. Depending on the configuration of the vehicle 12 and the inflatable curtain 14, particularly the slit 80, the front portion 64 may also overlie a portion of the C pillar 34. The rear portion 66 of the inflatable curtain 14 is positioned adjacent the side structure 16 and overlies at least a portion of the C pillar 34 of the vehicle 12 and at least a portion of the slider assembly 90. When the inflatable curtain 14 is in the inflated position, the tether 100 extends from the first location 104 across the slit 80 to the element 94, between the second portion 66 and the vehicle side structure 16.

The inflatable curtain 14, when inflated, thus extends from the A pillar 30 to the C pillar 34 of the vehicle 12 and overlies at least a portion of the A pillar, C pillar, and the B pillar 32 of the vehicle. When so deployed between the A pillar 30 and the C pillar 34, the inflated curtain 14 helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain. The tether 100 helps to maintain the curtain in the inflated position of FIG. 2 throughout the duration of a side impact and/or a vehicle rollover. The reduced length of the tether 100 helps reduce slack in the tether when the inflatable curtain 14 is inflated.

It will be recognized by those skilled in the art that the inflatable curtain 14 may have alternative configurations. For example, in the illustrated embodiment, the inflatable curtain 14 extends from the A pillar 30 to the C pillar 34 of the vehicle 12. The inflatable curtain 14 could, however, extend from the A pillar 30 to the B pillar 32 only, in which case the slider assembly 90 would be connected to the B pillar and the rear portion 66 would overlie the B pillar. The inflatable curtain 14 could also extend from the B pillar 32 to the C pillar 34 only, in which case the slider assembly 90 would be connected to the C pillar and the rear portion 66 would overlie the C pillar. By way of further example, in a vehicle having A, B, C, and D pillars (not shown), the inflatable curtain 14 could, when inflated, extend from the A pillar and to the D pillar. In this instance, the slider assembly 90 could be connected to the C pillar 34 or the D pillar and the rear portion 66 could overlie the C pillar, the D pillar, or both the C pillar and the D pillar.

Figure 5:
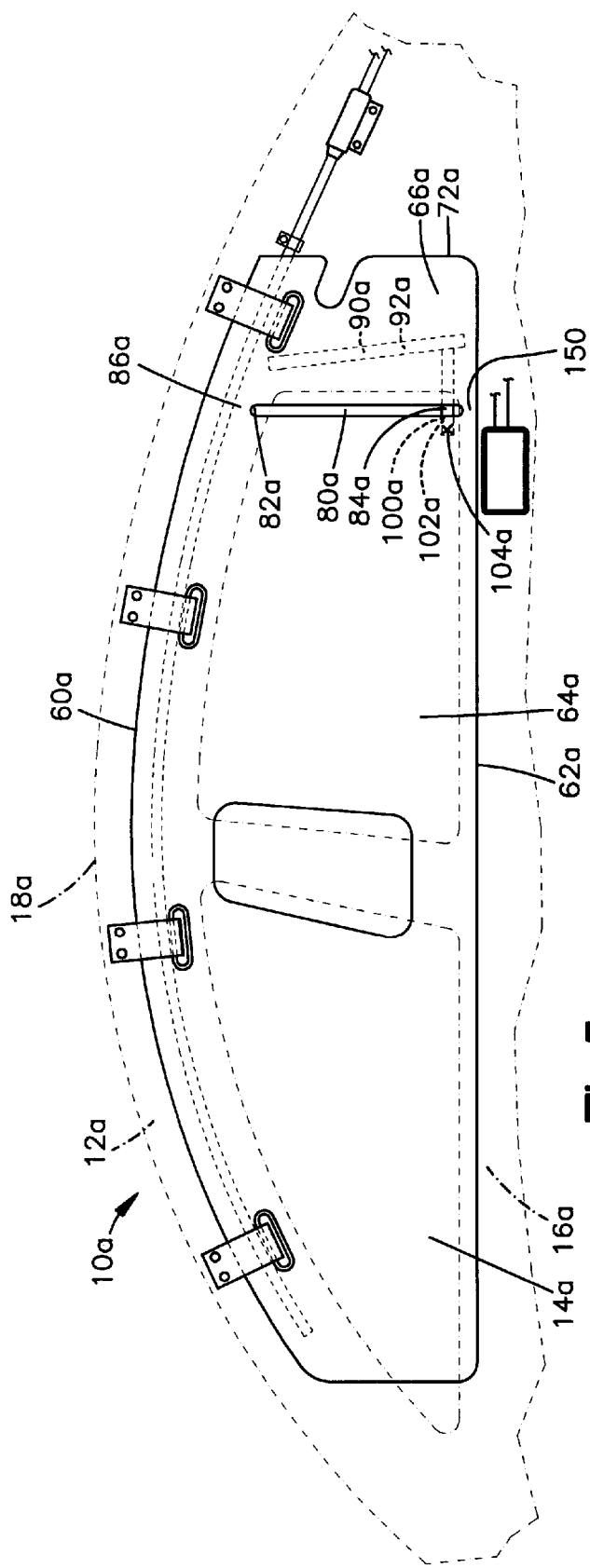
FIG. 5 is a schematic view of an apparatus for helping to protect a vehicle occupant, illustrating the apparatus in an inflated condition, according to a second embodiment of the present invention.

A second embodiment of the present invention is illustrated in FIGS. 5–6. The second embodiment of the invention is similar to the first embodiment of the invention illustrated in FIGS. 1–4. Accordingly, numerals similar to those of FIGS. 1–4 will be utilized in FIGS. 5–6 to identify similar components, the suffix letter "a" being associated with the numerals of FIGS. 5–6 to avoid confusion. The apparatus 10a of the second embodiment of the present invention is identical to the apparatus 10 of the first embodiment (FIGS. 1–4), except for the slit 80a in the inflatable curtain 14a of the second embodiment (FIGS. 5–6). The slit 80a has a different configuration than the slit 80 in the inflatable curtain 14 of the first embodiment (FIGS. 1–4).

As illustrated in FIG. 5, the slit 80a has a first end 82a spaced from the upper edge 60a of the inflatable curtain 14a and an opposite second end 84a spaced from the lower edge 62a of the curtain. The inflatable curtain 14a thus includes a second internal passage 150, opposite the passage 86a, defined between the second end 84a of the slit 80a and the lower edge 62a of the curtain. The second passage 150, along with the first passage 86a, provides fluid communication between the front and rear portions 64a and 66a.

Because the second end 84a of the slit 80a does not intersect the lower edge 62a, the front portion 64a and the rear portion 66a of the inflatable curtain 14a cannot be placed separately into the stored position as illustrated in the first embodiment of FIGS. 1–4. The slit 80a, however, does facilitate folding, rolling, or otherwise placing the inflatable curtain 14a in the stored condition while helping to reduce the required length of the tether 100a.

As illustrated in FIGS. 6a–6d, the front and rear portions 64a and 66a of the inflatable curtain 14a are placed in the stored position simultaneously. Preferably, the front and rear portions 64a and 66a are placed in the stored position via an outboard roll, in which the curtain is rolled up in an outboard direction towards the vehicle side structure (not shown in FIGS. 6a–6d). The outboard roll of the rear portion 66a is indicated generally by the curved arrows in FIGS. 6b and 6c.

As the inflatable curtain 14a is rolled up in the outboard direction, the tether 100a is rolled up around the portion of the curtain that forms the second passage 150. As the inflatable curtain 14a continues to be rolled up, the tether 100a becomes wound around the portion of the curtain that forms the second passage 150. The inflatable curtain 14a is rolled up until it reaches the position illustrated in FIG. 6d.

Figure 6A:
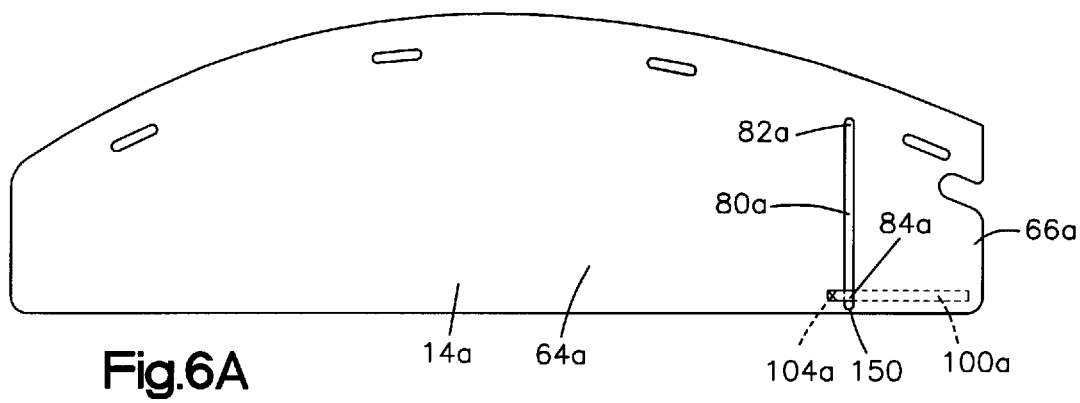
FIGS. 6a–6d are plan views of a portion of the apparatus of FIG. 5 illustrating a manner by which the apparatus may be placed in a stored condition.
Figure 6B:
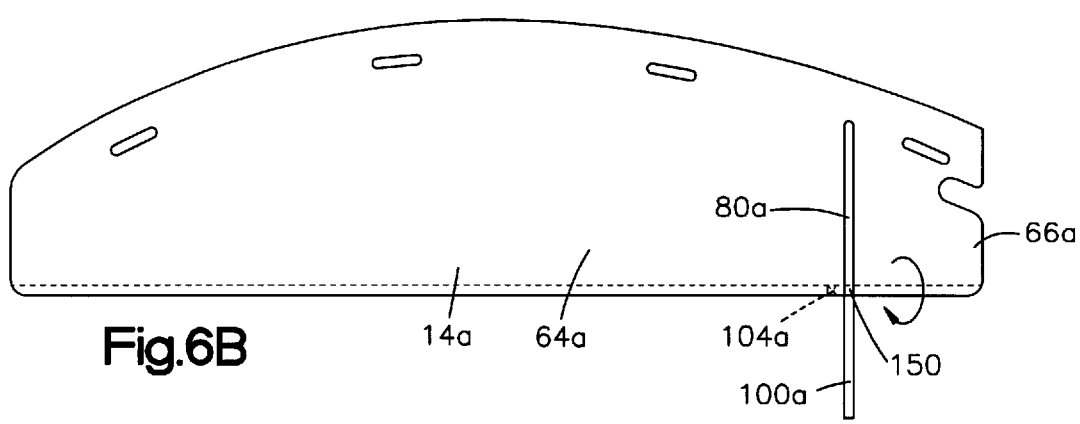
Figure 6C:
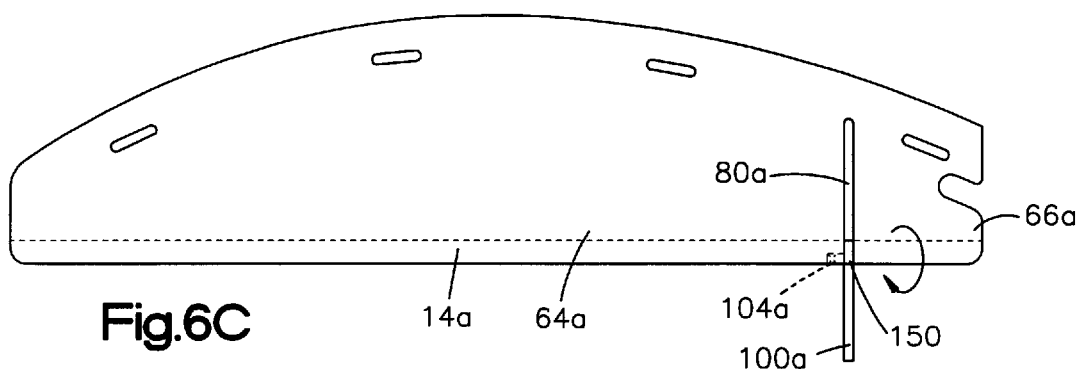
Figure 6D:
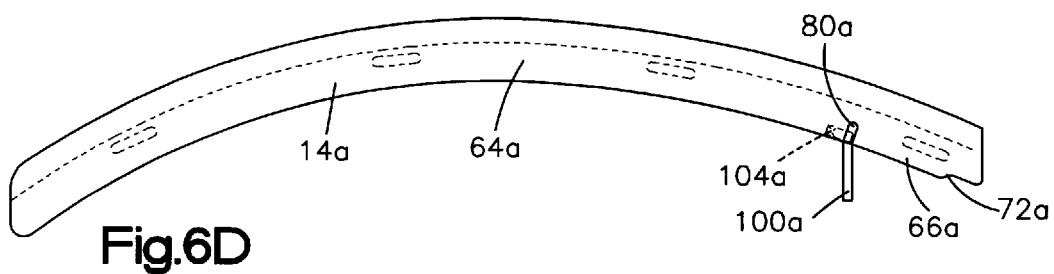

The inflatable curtain 14a, when rolled-up in the position illustrated in FIG. 6d, is in the stored position. When in the stored position, the tether 100a is wound only around the portion of the inflatable curtain 14a that forms the second passage 150. The tether 100a thus may be wound tightly and have a relatively small roll diameter. This helps to reduce the length of the tether 100a that is rolled up with the curtain 14a, which helps to reduce the required length of the tether.

When the inflatable curtain 14a is in the inflated position (FIG. 5), the tether 100a extends from the first location 104a across the slit 80a to the element 94a. The tether 100a is positioned between the second portion 66a and the vehicle side structure 16a. The slit 80a, being positioned forward of the slider assembly 90a, between the slider assembly and the first location 104a, helps to reduce the required length of the tether 100a. If the slit 80a were omitted, the tether 100a would have to extend from the first location 104a, out of the rolled curtain 14a at the rear edge 72a (FIGS. 5 and 6d) of the curtain, and back to the slider assembly 90a.

As the inflatable curtain 14a (FIG. 5) inflates, the tether 100a unrolls. The inflatable curtain 14a pulls on the tether 100a, which causes the element 94a to slide along the track 92a away from the vehicle roof 18a to the position illustrated in FIG. 5. The slider assembly 90a is configured to block movement of the element 94a along the track 92a in a direction towards the vehicle roof 18a.

The inflatable curtain 14a, when inflated, extends along the side structure 16a of the vehicle 12a and is positioned between the side structure and any occupants (not shown) of the vehicle. When so positioned, the inflated curtain 14a helps to protect a vehicle occupant in the event of a vehicle rollover or a side impact to the vehicle 12a. The inflatable curtain 14a, when inflated, helps to absorb the energy of impacts with the curtain and helps to distribute the impact energy over a large area of the curtain. The tether 100a helps to maintain the curtain in the inflated position throughout the duration of a side impact and/or a vehicle rollover. The reduced length of the tether 100a helps reduce slack in the tether when the inflatable curtain 14a is inflated.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:
    an inflatable vehicle occupant protection device adapted to inflate away from the vehicle roof into a position between the side structure of the vehicle and a vehicle occupant, said inflatable vehicle occupant protection device comprising an inflatable front portion and an inflatable rear portion, said front and rear portions being partially separated by a slit that extends through said inflatable vehicle occupant protection device;
    an inflation fluid source that provides inflation fluid for inflating said inflatable vehicle occupant protection device;
    a slider assembly adapted to be connected to the vehicle side structure; and
    a flexible elongated member having a first end connected to said front portion at a first location on said front portion and an opposite second end connected to said slider assembly,
    said rear portion when inflated overlying the entire slider assembly, said slit being positioned forward of said slider assembly when said inflatable vehicle occupant protection device is inflated, said flexible elongated member extending from said first location across said slit when said inflatable vehicle occupant protection device is inflated.

2. Apparatus as defined in claim 1, wherein said inflatable vehicle occupant protection device comprises an inflatable curtain having a stored position extending along the side structure adjacent the intersection of the side structure of the vehicle and the vehicle roof, said inflatable curtain extending along the side structure of the vehicle when said inflatable curtain is inflated.

3. Apparatus as defined in claim 2, wherein said slit extends in a generally vertical direction with respect to the direction of forward travel of the vehicle when said inflatable curtain is inflated.

4. Apparatus as defined in claim 2, wherein said slider assembly is connected to a C pillar of the vehicle.

5. Apparatus as defined in claim 2, wherein said first location is adjacent said slit.

6. Apparatus as defined in claim 2, wherein said first location is near a lower edge of said inflatable curtain.

7. Apparatus as defined in claim 2, wherein said flexible elongated member is positioned between said rear portion and the vehicle side structure when said inflatable curtain is inflated.

8. Apparatus as defined in claim 2, wherein said flexible elongated member comprises a tether.

9. Apparatus as defined in claim 2, wherein said flexible elongated member has a length slightly greater than the distance between said first location and said slider assembly when said inflatable curtain is inflated.

10. Apparatus as defined in claim 2, wherein said inflatable curtain, when inflated, has an upper edge positioned near the vehicle roof, an opposite lower edge, and front and rear edges spaced apart horizontally along said upper and lower edges, said front and rear edges extending between said upper and lower edges.

11. Apparatus as defined in claim 10, wherein said front portion is at least partially defined by said upper edge, said lower edge, said front edge and a first edge that helps to define said slit, said rear portion being at least partially defined by said upper edge, said lower edge, said rear edge, and a second edge that helps to define said slit.

12. Apparatus as defined in claim 10, wherein said slit extends from a position near said upper edge of said inflatable curtain to a position near said lower edge of said inflatable curtain.

13. Apparatus as defined in claim 12, wherein said front portion and rear portion are in fluid communication with each other.

14. Apparatus as defined in claim 10, further comprising a first passage positioned adjacent said upper edge of said inflatable curtain and a second passage positioned adjacent said lower edge of said inflatable curtain, said first and second passages providing fluid communication between said front portion and said rear portion.

15. Apparatus as defined in claim 14, wherein said flexible elongated member is rolled up around said second passage when said inflatable curtain is in said stored position.

16. Apparatus as defined in claim 10, wherein said slit extends from a position near said upper edge of said inflatable curtain, said slit extending through said lower edge of said inflatable curtain.

17. Apparatus as defined in claim 16, further comprising a passage positioned adjacent said upper edge of said inflatable vehicle occupant protection device, said passage providing fluid communication between said front portion and said rear portion.

18. Apparatus as defined in claim 16, wherein said front portion and said rear portion are placed in said stored position independently of each other.

19. Apparatus as defined in claim 18, wherein said front portion and said rear portion are rolled up into said stored position.

20. Apparatus as defined in claim 19, wherein said flexible elongated member extends from said first location along a generally straight path to an edge of said front portion, and from said edge of said front portion along a generally straight path to said slider assembly when said inflatable curtain is in said stored position.

21. Apparatus as defined in claim 2, wherein said slider assembly comprises a track adapted to be connected to the vehicle side structure and an element that is slidable along the track in a direction away from the vehicle roof, said second end of said flexible elongated member being connected to said element, said flexible elongated member pulling on said element to cause said element to slide along said track in said direction away from the vehicle roof during inflation of said inflatable curtain, said slider assembly being adapted to block movement of said element in a direction opposite said direction away from the vehicle roof.

22. Apparatus as defined in claim 2, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

23. Apparatus as defined in claim 2, wherein said inflatable curtain when inflated extends along the side structure of the vehicle from an A pillar to a C pillar of the vehicle.

24. Apparatus as defined in claim 2, wherein said inflatable curtain, when inflated, overlies at least a portion of an A pillar, a B pillar and a C pillar of the vehicle.

25. Apparatus as defined in claim 2, further comprising a sensor for sensing a vehicle condition for which deployment of said inflatable curtain is desired, said sensor actuating said inflation fluid source to provide inflation fluid to inflate said inflatable curtain.

26. Apparatus as defined in claim 2, wherein said inflation fluid source comprises an inflator that is actuatable to inflate said inflatable curtain.

27. Apparatus for helping to protect an occupant of a vehicle that has a side structure and a roof, said apparatus comprising:

an inflatable vehicle occupant protection device inflatable from a stored position to a deployed position between the side structure of the vehicle and a vehicle occupant, said inflatable vehicle occupant protection device, when inflated, having an upper edge positioned near the vehicle roof, an opposite lower edge, and inflatable front and rear portions partially defined by a slit extending from a position near said upper edge to a position near said lower edge, a lower portion of said inflatable vehicle occupant protection device extending between said front and rear portions along said lower edge;

an inflation fluid source that provides inflation fluid for inflating said inflatable vehicle occupant protection device;

a slider assembly adapted to be connected to the vehicle side structure; and a flexible elongated member having a first end connected to said front portion at a first location on said front portion and an opposite second end connected to said slider assembly, said flexible elongated member being rolled up around said lower portion when said inflatable vehicle occupant protection device is in said stored position.

28. Apparatus as recited in claim 27, wherein said lower portion comprises an inflation fluid passage for providing fluid communication between said front and rear portions.

* * * * *